United States Patent
Ewald et al.

(10) Patent No.: US 6,452,003 B1
(45) Date of Patent: Sep. 17, 2002

(54) PROCESS FOR PREPARING LOW-ODOR AND STORAGE-STABLE MONOMER-CONTAINING POLYISOCYANURATES FROM ISOPHORONE DIISOCYANATE

(75) Inventors: Michael Ewald, Marl; Rainer Lomoelder, Muenster; Stephan Kohlstruk, Marl, all of (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/899,241

(22) Filed: Jul. 6, 2001

(30) Foreign Application Priority Data

Jul. 7, 2000 (DE) .......................................... 100 33 099

(51) Int. Cl.[7] ...................... C07D 251/34; C08G 18/79; C08G 18/80; C08G 18/18; C08G 18/20
(52) U.S. Cl. ............... 544/222; 252/182.2; 252/182.21; 528/45; 528/52; 528/53; 528/54; 528/73; 528/67; 540/202; 544/193; 548/951; 548/952; 560/115; 560/354; 560/355; 564/32
(58) Field of Search ................................ 544/193, 222; 528/45, 52, 53, 54, 67, 73; 560/115, 354, 355; 564/32; 252/182.2, 182.21; 540/202; 548/951, 952

(56) References Cited

U.S. PATENT DOCUMENTS

| | | | |
|---|---|---|---|
| 3,996,223 A | 12/1976 | Gupta et al. | ................. 544/193 |
| 4,186,255 A | 1/1980 | Klein et al. | .................. 521/128 |
| 4,324,879 A | 4/1982 | Bock et al. | ..................... 528/45 |
| 4,503,226 A | 3/1985 | Tang et al. | ................. 544/193 |
| 4,596,678 A | 6/1986 | Merger et al. | ....... 560/349 CM |
| 4,596,679 A | 6/1986 | Hellbach et al. | ............ 560/344 |
| 4,697,014 A | 9/1987 | Robin | ......................... 599/193 |
| 4,960,848 A | * 10/1990 | Scholl et al. | .................. 528/48 |
| 5,087,739 A | 2/1992 | Bohmholdt et al. | ........ 560/345 |
| 5,221,743 A | 6/1993 | Goldstein et al. | ........... 544/193 |
| 5,258,482 A | 11/1993 | Jacobs et al. | .................. 528/49 |
| 5,691,440 A | * 11/1997 | Katz et al. | ..................... 528/52 |
| 5,905,151 A | 5/1999 | Slack et al. | ................. 544/222 |

FOREIGN PATENT DOCUMENTS

| | | |
|---|---|---|
| CA | 2 113 890 | 8/1994 |
| EP | 0 017 998 A1 | 10/1980 |
| EP | 0 056 159 A1 | 7/1982 |
| EP | 0 126 299 A1 | 11/1984 |
| EP | 0 126 300 A1 | 11/1984 |
| EP | 0 197 864 A1 | 10/1986 |
| EP | 0 355 443 A2 | 2/1990 |
| EP | 0 524 501 A1 | 1/1993 |
| EP | 0 798 299 A1 | 10/1997 |

OTHER PUBLICATIONS

Annalen der Chemie 562 (1949), p. 75 ff.

* cited by examiner

*Primary Examiner*—Rabon Sergent
(74) *Attorney, Agent, or Firm*—Oblon, Spivak, McClelland, Maier & Neustadt, P.C.

(57) ABSTRACT

The present invention provides a process, which includes:
partially trimerizing isophorone diisocyanate in the presence of a catalyst having the formula:

$$[R-NX_3]^{\oplus}Y^{\ominus}$$

wherein R and X are butyl groups and $Y^-$ is $CH_3COO^-$; or wherein R is a benzyl group, $Y^-$ is a carboxylate anion having from 4 to 8 carbon atoms and each X is an alkylene group having from 2 to 3 carbon atoms, wherein the three alkylene groups share a common carbon atom and, together with the N atom in the formula, form a tricyclic structure, and wherein at least one alkyene group has at least one OH group in an α or β γ position relative to the N atom, to obtain a monomer-containing polyisocyanurate mixture. The present invention also provides a monomer-containing polyisocyanurate mixture made from the above process.

38 Claims, No Drawings

PROCESS FOR PREPARING LOW-ODOR AND STORAGE-STABLE MONOMER-CONTAINING POLYISOCYANURATES FROM ISOPHORONE DIISOCYANATE

BACKGROUND OF THE INVENTION

1. Field of the Invention

The present invention relates to a process for preparing low-odor and storage-stable monomer-containing polyisocyanurates from isophorone diisocyanate.

2. Discussion of the Background

Polyisocyanurates as polyisocyanate adducts are valuable components for producing high-quality coatings having good mechanical properties and good light and weather resistance. Polyisocyanurates derived from isophorone diisocyanate (IPDI) are also used as raw material for elastomer applications. Here, it can be desirable for the IPDI-based polyisocyanurate, also referred to as IPDI trimer, to be used in monomer containing form.

Polyisocyanurates are typically obtained by the catalytic trimerization of suitable isocyanates. Suitable isocyanates include, for example, aromatic, cycloaliphatic and aliphatic bifunctional and higher-functional polyisocyanates. Suitable catalysts include, for example, tertiary amines (U.S. Pat. No. 3,996,223), alkali metal salts of carboxylic acids (CA 2 113 890; EP 056 159), quaternary ammonium salts (EP 798 299; EP 524 501; U.S. Pat. No. 4,186,255; U.S. Pat. No. 5,258,482; U.S. Pat. No. 4,503,226; U.S. Pat. No. 5,221,743), amino silanes (EP 197 864; U.S. Pat. No. 4,697,014) and quaternary hydroxyalkylammonium salts (EP 017 998; U.S. Pat. No. 4,324,879). Depending on the catalyst, the use of various cocatalysts is also possible, e.g. OH-functional compounds or Mannich bases derived from secondary amines and aldehydes or ketones.

To carry out the trimerization, the polyisocyanates are allowed to react in the presence of the catalyst, if desired with addition of solvents and/or auxiliaries, until the desired conversion has been reached. In this context, the term "partial trimerization" is typical since the desired conversion is generally significantly below 100%. The reaction is then stopped by deactivation of the catalyst. Deactivation is achieved by addition of a catalyst inhibitor such as p-toluene sulfonic acid, hydrogen chloride or dibutyl phosphate; and unavoidably and often undesirably results in the contamination of the resulting polyisocyanate containing isocyanurate groups.

In the trimerization of isocyanates on an industrial scale, the use of quaternary hydroxyalkylammonium carboxylates as oligomerization catalysts is particularly advantageous. This type of catalyst is thermally labile and allows targeted thermal deactivation, so that it is not necessary to stop the trimerization by addition of potentially quality-reducing inhibitors when the desired conversion has been reached.

Monomer-containing IPDI trimer, which is suitable, for example, for elastomer applications, has an NCO content of at least 25% by weight for viscosity reasons. The polyisocyanurate is prepared by partial trimerization of IPDI in the presence of one or more suitable catalysts. The catalyst must then either be removed completely from the reaction solution, which can be achieved by short-path distillation or thin-film evaporation, or be deactivated because the trimer is not storage-stable in the presence of active catalyst residues. If the NCO content of the IPDI polyisocyanurate obtained is below the desired level, it can easily be adjusted as desired by diluting the solution with monomeric IPDI.

Alkali metal salts of carboxylic acids are not well suited as catalysts for the preparation of monomer containing IPDI trimer since these catalysts can be removed from the reaction products only with difficulty, if at all. With respect to the available amine-containing catalysts, it has been found that the resulting IPDI trimer solutions usually have a distinctly perceptible and undesirable odor, which is sufficiently pronounced to be noticeable and unpleasant in the final application. In industrial practice, the undesirable odor is eliminated by freeing the reaction solution after partial trimerization and catalyst deactivation of excess IPDI, of odor-imparting components and possibly of undesirable catalyst inhibitors. This freeing is generally achieved by short-path distillation or thin-film evaporation. The solid resin that has been freed of monomer is subsequently converted by the addition of fresh IPDI into the desired, low-odor and monomer-containing IPDI polyisocyanurate.

The sequence of partial trimerization/deactivation, monomer removal/purification and subsequent dissolution of the solid resin in the monomer is very complicated. The monomer removal step is particularly time-consuming and costly, and it limits the capacity or and creates a bottleneck in the known processes.

SUMMARY OF THE INVENTION

It is an object of the present invention to provide a process for preparing monomer containing polyisocyanurates that avoids the problems associated with conventional processes.

It is another object of the present invention to provide a more economical process for preparing monomer-containing polyisocyanurates.

It is another object of the present invention to provide a process for preparing low-odor monomer-containing polyisocyanurates.

It is another object of the present invention to provide a process for preparing storage-stable monomer-containing polyisocyanurates.

It is another object of the present invention to provide a process for preparing low-odor and storage-stable monomer-containing polyisocyanurates from isophorone diisocyanate.

It is another object of the present invention to provide a process for preparing monomer-containing polyisocyanurates which avoids the monomer removal step.

It is another object of the present invention to provide a more economical process for preparing low-odor and storage-stable monomer-containing polyisocyanurates from isophorone diisocyanate which avoids the need for the monomer removal step.

It is another object of the present invention to provide low-odor and storage-stable monomer-containing polyisocyanurates.

It is another object of the present invention to provide low-odor and storage-stable monomer-containing polyisocyanurates that avoids the need for quality-reducing catalyst inhibitors.

It is another object of the present invention to provide low-odor and storage-stable monomer-containing polyisocyanurates that avoids the need for monomer removal and/or chemical deactivation of the isophorone diisocyanate trimerization catalyst.

The objects of the present invention, and others, may be accomplished with the present invention, the first embodiment of which provides a process, including:

partially trimerizing isophorone diisocyanate in the presence of a catalyst having the formula:

wherein R and X are butyl groups and Y⁻ is $CH_3COO^-$; or wherein R is a benzyl group, Y⁻ is a carboxylate anion having from 4 to 8 carbon atoms and each X is an alkylene group having from 2 to 3 carbon atoms, wherein the three alkylene groups share a common carbon atom and, together with the N atom in the formula, form a tricyclic structure, and wherein at least one alkyene group has at least one OH group in an α or β or γ position relative to the N atom, to obtain a monomer-containing polyisocyanurate mixture.

Another embodiment of the present invention provides a monomer-containing polyisocyanurate mixture, prepared by a process including:

partially trimerizing isophorone diisocyanate in the presence of a catalyst having the formula:

wherein R and X are butyl groups and Y⁻ is $CH_3COO^-$; or wherein R is a benzyl group, Y⁻ is a carboxylate anion having from 4 to 8 carbon atoms and each X is an alkylene group having from 2 to 3 carbon atoms, wherein the three alkylene groups share a common carbon atom and, together with the N atom in the formula, form a tricyclic structure, and wherein at least one alkyene group has at least one OH group in an α or β or γ position relative to the N atom.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Preferably, the process includes preparing low-odor and storage-stable monomer containing polyisocyanurates from isophorone diisocyanate by partial trimerization over a period of from 30 seconds to 2 hours in the presence of from 0.01 to 2% by weight, based on the weight of the diisocyanate, of a catalyst of the formula:

where R and X are butyl groups and Y⁻ is $CH_3COO^-$, or R is a benzyl group and Y⁻ is a carboxylate anion having from 4 to 8 carbon atoms and in this case X is an alkylene group having from 2 to 3 carbon atoms, with the three radicals X together with the quaternary nitrogen forming, via a common carbon atom, a tricyclic structure which has at least one OH group in the α or β or γ position relative to the nitrogen, at a temperature of from 0 to 200° C.

By use of the present invention, monomer removal and chemical deactivation of the trimerization catalyst can be omitted. It could not have been foreseen that the present invention, which requires, inter alia, the claimed catalysts would result in a such an economical process.

Isocyanates suitable for the trimerization can be prepared by various methods (Annalen der Chemie 562 (1949), p. 75 ff, the entire contents of which are hereby incorporated by reference). A method which has been found particularly useful in industry is phosgenation of organic polyamines to form the corresponding polycarbamic acid chlorides and thermal dissociation of these into organic polyisocyanates and hydrogen chloride. As an alternative, organic polyisocyanates can also be prepared without the use of phosgene, i.e. by phosgene-free processes. According to EP 126 299 (U.S. Pat. No. 4,596,678), EP 126 300 (U.S. Pat. No. 4,596,679) and EP 355 443 (U.S. Pat. No. 5,087,739), the entire contents of each of which being hereby incorporated by reference, (cyclo)aliphatic diisocyanates such as 1-isocyanato-3-isocyanatomethyl-3,5,5-trimethylcyclohexane (isophorone diisocyanate or IPDI) can, for example, be obtained by reaction of the parent (cyclo)aliphatic diamines with urea and alcohols to form (cyclo)aliphatic biscarbamic esters and thermal dissociation of these into the corresponding diisocyanates and alcohols.

As far as the process of the invention for preparing low-odor and storage-stable monomer-containing polyisocyanurates from isophorone diisocyanate is concerned, the synthetic route by means of which the IPDI used has been prepared is not particularly limited. However, it may be pointed out that the preferable amount of catalyst used to achieve a desired NCO content is dependent, inter alia, on the quality of the raw material. Experience has shown that an increasing content of hydrolyzable chlorine compounds in the IPDI makes an increase in the amount of catalyst necessary. The hydrolyzable chlorine apparently tends to have an inhibiting effect on the catalyst.

Preferably, to prepare the tricyclic trimerization catalysts, a two-stage synthetic route can be employed. In the first step, the parent tertiary tricyclic amine is quaternized by means of a benzylating agent. Suitable benzylating agents are, for example, benzyl chloride, benzyl bromide, benzyl iodide, benzyl tosylate or benzyl triflate, while a suitable amine is, for example, 3-hydroxyquinuclidine. The quaternization occurs at from 0° C. to 100° C., preferably 10° C. to 90° C., and more preferably 20° C. to 80° C. and can be carried out in the presence or absence of solvents. These ranges include all values and subranges therebetween, including 5, 15, 25, 35, 45, 55, 65, and 75° C. The solvent-based process is generally preferred.

In the second step, the quaternary, tricyclic ammonium salt obtained is converted into the desired catalyst. For this purpose, a basic ion exchange resin (e.g. Amberlyst, Dowex or Sephadex) is activated with aqueous potassium hydroxide or aqueous sodium hydroxide and loaded with the desired carboxylic acid. Examples of suitable carboxylic acids are pivalic acid, hexanoic acid, 2-ethylhexanoic acid, adipic acid and succinic acid. The quaternary ammonium salt is then introduced onto the chromatographic column and eluted. The eluate comprises the desired quaternary ammonium carboxylate. The solvent can be removed by application of vacuum. In the case of the quaternary ammonium halides, the catalysts can also be obtained in very pure form by cation exchange in solution if the silver carboxylates of the specified carboxylic acids are used as reactants. It is also possible to convert the quaternary ammonium salts firstly into the corresponding quaternary ammonium hydroxides by means of ion exchange chromatography and then to convert these into the quaternary ammonium carboxylates by reaction with the desired carboxylic acid, possibly with the removal of the water liberated.

The preparation according to the invention of the low odor and storage-stable monomer-containing polyisocyanurates from isophorone diisocyanate by partial trimerization can be carried out continuously (tube reactor or reactor cascade) or batchwise. The catalyst is preferably used in a low concentration in the range from 0.01 to 2% by weight.

The precise amount can easily be determined experimentally and depends on the catalyst, on the intended conversion, on the quality of the IPDI used and on the way in which the process is carried out.

Preferably, the partial trimerization is carried out over a period of from 30 seconds to 2 hours, more preferably from 1 minute to 1.5 hours, and most preferably from 5 minutes to one hour. These ranges include all values and subranges therebetween, including 45 seconds, and 1.5, 7, 9, 10, 25, 35, 45, 55, 65, 75, 85, 95, 100, and 115 minutes.

The term "monomer-containing polyisocyanurate mixture" preferably means a mixture containing at least one or more isocyanurates, polyisocyanurates, or both, and monomeric IPDI. In addition to monomeric IPDI, the product includes compounds which have one or more isocyanurate rings. Compounds having a uretdione structure may also be present in small amounts as by-products. Compounds of this type are described in the literature.

The catalyst is preferably used in an amount of from 0.01 to 2% by weight, more preferably 0.04 to 1% by weight, and most preferably 0.09 to 0.8% by weight, based on the weight of the diisocyanate. These ranges include all values and subranges therebetween, including 0.02, 0.03, 0.05, 0.06, 0.07, 0.2, 0.5, 0.7, 1.1, 1.4, and 1.6% by weight, based on the weight of the isophorone diisocyanate used. Preferably, the process of the invention is carried out at temperatures in the range from 0° C. to 200° C., more preferably from 20° C. to 180° C., and most preferably from 40° C. to 160° C. These ranges include all values and subranges therebetween, including 10, 30, 50, 80, 120, 140, 150, 170 and 190° C. The process may be carried out either batchwise or continuously. The batch process is preferred.

The batch process is preferably carried out in a stirred reactor. Here, the mixture of isophorone diisocyanate and catalyst is usually placed in the reactor at room temperature. Preferably, the temperature of the reaction mixture is subsequently increased to from 40 to 140° C. and more preferably to from 55 to 100° C., so as to initiate the trimerization. These ranges include all values and subranges therebetween, including 10, 30, 50, 80, and 120° C. As an alternative, the catalyst can also be introduced after the IPDI has reached the temperature necessary for the reaction. However, this variant is not preferred. The trimerization is exothermic. The catalyst can be used in pure form, but it is also possible to dissolve the catalyst in a suitable solvent and to introduce it in this form.

The continuous trimerization is preferably carried out in a reaction loop with continuous, uniform metered addition of IPDI and the catalyst at from 40 to 180° C., more preferably from 60 to 160° C., and most preferably from 80 to 140° C. and preferably over a period of from 30 seconds to 10 minutes, more preferably from 40 seconds to 7 minutes, and most preferably from 55 seconds to 6 minutes, which ranges include all values and subranges therebetween. A reaction loop having a small diameter leads to high flow velocities and consequently to good mixing. It is also preferable to heat the IPDI/catalyst mixture to from about 50 to 60° C. before introduction into the reaction loop. For more precise metering and optimal mixing of the catalyst, it is also preferable to dissolve the catalyst in a suitable solvent. Suitable solvents are in principle all those in which the catalyst has a good solubility, e.g. water, low molecular alcohols such as methanol or low molecular weight organic acids such as acetic acid or hexanoic acid. Mixtures are possible.

The continuous trimerization can also be carried out in a reactor cascade. A combination of a reactor cascade and a tube reactor is also suitable.

Preferably, the temperature profile of the process of the invention should be such that the reaction solution reaches a temperature of from 150 to 180° C., and more preferably at least from 140 to 160° C., which ranges include all values and subranges therebetween, including 152, 155, 161, 168, 174 and 178° C. In this way it can be ensured that the product prepared according to the invention meets the criterion of storage stability and thus does not gel during prolonged storage.

The low-odor and storage-stable monomer-containing polyisocyanurates prepared according to the invention from isophorone diisocyanate have an NCO content of from 25 to 34% by weight. This range includes all values and subranges therebetween, including 26, 27, 28, 29, 30, 31, 32, and 33% by weight. They are useful intermediates for polyurethane coatings and elastomer applications. In these applications, they may preferably be used in a form which has been blocked with blocking agents. Suitable blocking agents are, for example, lactams such as 6-caprolactam, oximes such as methyl ethyl ketoxime or butanone oxime, triazoles such as 1H-1,2,4-triazole, readily enolizable compounds such as ethyl acetoacetate or acetylacetone or else malonic acid derivatives such as diesters of malonic acid.

EXAMPLES

Having generally described this invention, a further understanding can be obtained by reference to certain specific examples which are provided herein for purposes of illustration only and are not intended to be limiting unless otherwise specified.

A. Catalyst Preparation

A.1. Preparation of N-benzyl-3-hydroxyquinuclidinium 2-ethylhexanoate

In a three-necked flask fitted with Claisen attachment, mechanical stirrer attachment, dropping funnel and gas inlet and gas outlet, benzyl bromide (0.3 mol; 35.1 g) was added dropwise at room temperature to a solution of 3-hydroxyquinuclidine (0.25 mol; 31.8 g) in acetone (1000 ml) over a period of 5 minutes while stirring. The mixture was stirred for 24 hours at room temperature, the precipitate was filtered off, washed with a little acetone and the product was dried at 30° C. in an oil pump vacuum. This gave 60.2 g (81%) of N-benzyl -3-hydroxyquinuclidinium bromide as a white powder which was dissolved in 500 ml of MeOH.

A chromatography column (diameter about 3.5 cm) was charged with Dowex IX8–50 and supplied in succession with an aqueous 1M NaOH solution, distilled water, a 35% strength solution of 2-ethylhexanoic acid in methanol and finally the methanolic solution of the quaternary ammonium bromide. The catalyst was eluted with MeOH, and the eluate was evaporated under reduced pressure. Yield: 78.2 g (87%) of N-benzyl -3hydroxyquinuclidinium 2-ethylhexanoate as a white powder.

B. Trimerization:

Examples 1 to 5

The reactions were carried out under an $N_2$ atmosphere.
B.1. Trimerization of IPDI using N-benzyl-3hydroxyquinuclidinium 2-ethylhexanoate 800 g of IPDI were admixed at room temperature with 4.0 g (0.5% by weight) of N-benzyl -3hydroxyquinuclidinium 2-ethylhexanoate. The temperature of the mechanically stirred reaction mixture was increased at a gradient of from 2.5 to 3.0° C./min until a temperature of 160° C. had been reached. The mixture was subsequently allowed to cool to room temperature. The NCO content of the low-odor reaction product was 29.2% and remained stable even after heating at 50° C. (12 h).

B.2. Trimerization of IPDI using N-benzyl-3hydroxyquinuclidinium 2-ethylhexanoate/MeOH 800 g of IPDI were admixed at room temperature with 5.3 g (0.5% by weight based on the solvent-free catalyst) of a 75% strength solution of N-benzyl-3hydroxyquinuclidinium 2-ethylhexanoate in methanol. The temperature of the mechanically stirred reaction mixture was increased at a gradient of from 2.5 to 3° C./min until a temperature of 160° C. had been reached. The mixture was subsequently allowed to cool to room temperature. The NCO content of the low-odor reaction product was 28.4% and remained stable even after heating at 50° C. (12 h) (a slight NCO loss due to allophanate formation was observed).

B.3. Trimerization of IPDI using tetrabutylammonium acetate/MeOH 1500 g of IPDI were admixed at room temperature with 1.06 g (0.07% by weight) of tetrabutylammonium acetate (TBAAc). The temperature of the mechanically stirred reaction mixture was increased at a gradient of from 2.5 to 3° C./min. After a temperature peak of 158° C. had been reached, the reaction was complete. The mixture was allowed to cool to room temperature. The NCO content of the low-odor reaction product was 28.3% and remained stable even after heating at 50° C. (12 h).

B.4. Trimerization of IPDI Using Tetrabutylammonium acetate/MeOH 1500 g of IPDI were admixed at room temperature with 1.41 g (0.07% by weight based on the solvent-free catalyst) of a 75% strength solution of tetrabutylammonium acetate (TBAAc) in methanol. The temperature of the mechanically stirred reaction mixture was increased at a gradient of from 2.5 to 3° C./min. After a temperature peak of 167° C. had been reached, the reaction was complete. The mixture was allowed to cool to room temperature. The NCO content of the low-odor reaction product was 27.0% and remained stable even after heating at 50° C. (12 h) (a slight NCO loss due to allophanate formation was observed).

B.5. Trimerization of IPDI using tetrabutylammonium acetate/MeOH 800 g of IPDI were admixed at 100° C. with 0.72 g (0.07% by weight based on the solvent-free catalyst) of a 75% strength solution of tetrabutylammonium acetate (TBAAc) in methanol, after which the temperature of the reaction mixture rose to a peak of 151° C. over a period of 6 minutes. The mixture was allowed to cool to room temperature. The NCO content of the low-odor reaction product was 27.8% and remained stable even after heating at 50° C. (12 h) (a slight NCO loss due to allophanate formation was observed).

Comparative Examples 1 to 5

C.1. Trimerization of IPDI using Dabco TMR®

1500 g of IPDI were admixed at 80° C. with 3.75 g (0.25% by weight) of Dabco TMR®(N—(2-hydroxypropyl)-N,N,N-trimethylammonium 2-ethylhexanoate, about 75% strength in diethylene glycol). Owing to the strongly exothermic nature of the reaction, the temperature of the mechanically stirred reaction mixture rose to a peak of 136° C. over a period of about 3 minutes. The mixture was allowed to cool to room temperature. The NCO content of the reaction product, which smelled strongly of amine, was 28.9% and remained stable even after heating at 50° C. (12 h).

To eliminate the odor problem, unreacted IPDI was separated from the polyisocyanate by short-path evaporation. After dilution of the now monomer-free resin with fresh IPDI to an NCO content of 29.6%, a low-odor monomer-containing IPDI trimer was obtained.

C.2. Trimerization of IPDI using Dabco TMR®-2

1500 g of IPDI were admixed at 80° C. with 3.75 g (0.25% by weight) of Dabco TMR®-2 (N-(2-hydroxypropyl) -N,N,N-trimethylammonium formate, about 75% strength in diethylene glycol). Owing to the strongly exothermic nature of the reaction, the temperature of the mechanically stirred reaction mixture rose to a peak of 139° C. over a period of about 3 minutes. The mixture was allowed to cool to room temperature. The NCO content of the reaction product, which smelled strongly of amine, was 28.2% and remained stable even after heating at 50° C. (12 h).

To eliminate the odor problem, unreacted IPDI was separated from the polyisocyanate by short-path evaporation. After dilution of the now monomer-free resin with fresh IPDI to an NCO content of 29.6%, a low-odor monomer-containing IPDI trimer was obtained.

C.3. Trimerization of IPDI using N-(2-hydroxypropyl)-N,N,N-trimethylammonium hydroxide 1500 g of IPDI were admixed at 80° C. with 3.75 g (0.25% by weight) of N-(2-hydroxypropyl)-N,N,N-trimethylammonium hydroxide (about 75% strength in diethylene glycol). Owing to the strongly exothermic nature of the reaction, the temperature of the mechanically stirred reaction mixture rose to a peak of 143° C. over a period of about 3 minutes. The mixture was allowed to cool to room temperature. The NCO content of the reaction product, which smelled strongly of amine, was 27.6% and remained stable even after heating at 50° C. (12 h).

To eliminate the odor problem, unreacted IPDI was separated from the polyisocyanate by short-path evaporation. After dilution of the now monomer-free resin with fresh IPDI to an NCO content of 29.6%, a low-odor monomer-containing IPDI trimer was obtained.

C.4. Trimerization of IPDI Using Hexamethyldisilazane (HMDS)

1600 g of IPDI were admixed at 100° C. with 1.6 g (1% by weight, 0.1 mol) of HMDS. After no conversion was observed after 30 minutes, the temperature of the mechanically stirred reaction mixture was increased to 120° C. Under these conditions, too, no appreciable conversion could be achieved. The mixture was allowed to cool to 50° C. and the catalyst was deactivated by addition of 0.9 g (0.05 mol) of water. The reaction solution had an NCO content of 37.2% and gave off an amine-like odor. Owing to the low conversion, elimination of the odor problem by short-path evaporation and subsequent dilution of the now monomer free resin with fresh IPDI were omitted.

C.5. Trimerization of IPDI using benzyltriethylammonium acetate 800 g of IPDI were admixed at room temperature with 1.34 g (0.17% by weight) of benzyltriethylammonium acetate in methanol. The temperature of the mechanically stirred reaction mixture was increased at a gradient of from 2.5 to 3° C./min. After a temperature peak of 149° C. had been reached, the reaction was complete. The mixture was allowed to cool to room temperature. The reaction solution had an NCO content of 32.7% and gave off a distinct odor.

To eliminate the odor problem, unreacted IPDI was separated from the polyisocyanate by short-path evaporation. After dilution of the now monomer-free resin with fresh IPDI to an NCO content of 29.6%, a low-odor monomer-containing IPDI trimer was obtained.

TABLE 1

Trimerization of IPDI
(Examples B.1–B.5 and Comparative Examples C.1–C.5)

| Experiment | Category | Catalyst | Amount of catalyst (% by weight) | NCO content (% by weight) | Comments |
|---|---|---|---|---|---|
| B.1. | Example | N-benzyl-3-hydroxyquinuclidinium 2-ethylhexanoate | 0.5 | 29.2 | storage-stable, low in odor |
| B.2. | Example | N-benzyl-3-hydroxyquinuclidinium 2-ethylhexanoate/MeOH | 0.5 | 28.4 | storage-stable, low in odor |
| B.3. | Example | Tetrabutylammonium acetate | 0.07 | 28.3 | storage-stable, low in odor |
| B.4. | Example | Tetrabutylammonium acetate/MeOH | 0.07 | 27.0 | storage-stable, low in odor |
| B.5. | Example | Tetrabutylammonium acetate/MeOH | 0.07 | 27.8 | storage-stable, low in odor |
| C.1. | Comparative example | Dabco TMR ® | 0.25 | 28.9 | storage-stable, distinct odor |
| C.2. | Comparative example | Dabco TMR ® | 0.25 | 28.2 | storage-stable, distinct odor |
| C.3. | Comparative example | N-(2-hydroxypropyl)-N,N,N-trimethylammonium hydroxide | 0.25 | 27.6 | storage-stable, distinct odor |
| C.4. | Comparative example | Hexamethyldisilazane | 1.0 | 37.2 | storage-stable, distinct odor |
| C.5. | Comparative example | Benzyltriethylammonium acetate | 0.17 | 32.7 | storage-stable, distinct odor |

Obviously, numerous modifications and variations of the present invention are possible in light of the above teachings. It is therefore to be understood that within the scope of the appended claims, the invention may be practiced otherwise than as specifically described herein.

This application is based on German patent application 100 33 099.1, filed Jul. 7, 2000, the entire contents of which are hereby incorporated by reference, the same as if set forth at length.

What is claimed is:

1. A process, comprising:
partially trimerizing isophorone diisoyanate at a temperature reaching at least 140° to 167° C. in the presence of a catalyst, said catalyst consisting of a compound having the formula:

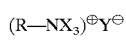

wherein R and X are butyl groups and $Y^-$ is $CH_3COO^-$; or
wherein R is a benzyl group, $Y^-$ is a carboxylate anion having from 4 to 8 carbon atoms and each X is an alkylene group having from 2 to 3 carbon atoms, wherein said three alkylene groups share a common carbon atom and, together with the N atom in the formula, form a bridged tricyclic structure, and wherein at least one alkyene group has at least one OH group in an α or β or γ position relative to the N atom,
to obtain a monomer-containing polyisocyanurate mixture.

2. The process as claimed in claim 1, wherein R and X are butyl groups and $Y^-$ is $CH_3COO^-$.

3. The process as claimed in claim 1, wherein R is a benzyl group, $Y^-$ is a carboxylate anion having from 4 to 8 carbon atoms and each X is an alkylene group having from 2 to 3 carbon atoms, wherein said three alkylene groups share a common carbon atom and, together with the N atom in the formula, form a tricyclic bridged structure, and wherein at least one alkyene group has at least one OH group in an α or β or γ position relative to the N atom.

4. The process as claimed in claim 1, wherein the catalyst is selected from the group consisting of N-benzyl-3-hydroxyquinuclidinium 2-ethylhexanoate, or tetrabutylammonium acetate.

5. The process as claimed in claim 1, wherein the carboxylate anion having from 4 to 8 carbon atoms is an anion of a carboxylic acid selected from the group consisting of pivalic acid, hexanoic acid, 2-ethylhexanoic acid, adipic acid and succinic acid.

6. The process as claimed in claim 1, wherein the partial trimerization is carried out over a period of 30 seconds to 2 hours.

7. The process as claimed in claim 1, wherein said catalyst is present in an amount of 0.01 to 2% by weight, based on the weight of the diisocyanate.

8. The process as claimed in claim 1, wherein said catalyst is present in an amount of 0.04 to 1% by weight, based on the weight of the diisocyanate.

9. The process as claimed in claim 1, wherein the isophorone diisocyanate is prepared by a phosgene process or a phosgene-free process.

10. The process as claimed in claim 1, wherein the monomer-containing polyisocyanurate mixture comprise one or more free-NCO groups.

11. The process as claimed in claim 1, wherein the monomer-containing polyisocyanurate mixture has a free —NCO content of 25 to 34% by weight with respect to the total weight of said mixture.

12. The process as claimed in claim 1, wherein the partial trimerization is carried out continuously.

13. The process as claimed in claim 1, wherein the partial trimerization is carried out batchwise.

14. The process as claimed in claim 1, wherein the partial trimerization is carried out in a solvent selected from the group consisting of water, methanol, acetic acid, hexanoic acid, and a mixture thereof.

15. The process as claimed in claim 1, which is carried out in the absence of a catalyst deactivating agent.

16. The process as claimed in claim 1, further comprising reacting the monomer-containing polyisocyanurate mixture with a blocking agent selected from the group consisting of lactams, oximes, triazoles, enolizable compounds, malonic acid derivatives, and mixtures thereof.

17. The process as claimed in claim 1, further comprising reacting the monomer-containing polyisocyanurate mixture with a blocking agent selected from the group consisting of 6-caprolactam, oxime, methyl ethyl ketoxime, butanone oxime, 1H-1,2,4-triazole, ethyl acetoacetate or acetylacetone, diester of malonic acid, and mixtures thereof.

18. The process as claimed in claim 1, wherein said process is carried out in a solvent, further comprising separating said solvent from said mixture.

19. A monomer-containing polyisocyanurate mixture, prepared by a process comprising:
partially trimerizing isophorone diisocyanate at a temperature reaching at least 140° to 167° C. in the presence of a catalyst, said catalyst consisting of a compound having the formula:

wherein R and X are butyl groups and Y⁻ is CH₃COO⁻; or
wherein R is a benzyl group, Y⁻ is a carboxylate anion having from 4 to 8 carbon atoms and each X is an alkylene group having from 2 to 3 carbon atoms, wherein said three alkylene groups share a common carbon atom and, together with N atom in the formula, from a tricyclic bridged structure, and wherein at least one alkyene group has at least one OH group in an α or β or γ position relative to the N atom.

20. A process, comprising:
partially trimerizing isophorone diisocyanate in the presence of a catalyst having the formula:

wherein R is a benzy group, Y⁻ is a carboxylate anion having from 4 to 8 carbon atoms and each X is an alkylene group having from 2 to 3 carbon atoms, wherein the three alkylene groups share a common carbon atom and, together with N atom in the formula, form a bridged tricyclic structure, and wherein at least one alkyene group has at least on OH group in an α or β or γ position relative to the N atom,
to obtain a monomer-containing polyisocyanurate mixture.

21. The process as claimed in claim 20, wherein the catalyst is N-benzyl-3- hydroxyquinuclidinium 2-ethylhexanoate.

22. The process as claimed in claim in claim 20, wherein the carboxylate anion having from 4 to 8 carbon atoms is an anion of a carboxylic acid selected from the group consisting of pivalic acid, hexanoic acid, 2-ethylhexanoic acid, adipic acid and succinic acid.

23. The process as claimed in claim 20, wherein the partial trimerization is carried out over a period of 30 seconds to 2 hours.

24. The process as claimed in claim 20, wherein said catalyst is present in an amount of 0.01 to 20% by weight, based on the weight of the diisocyanate.

25. The process as claimed in claim 20, wherein said catalyst is present in an amount of 0.04 to 1% by weight, based on the weight of the diisocyanate.

26. The process as claimed in claim 20, wherein the partial trimerization is carried out at a temperature of 0 to 200° C.

27. The process as claimed in claim 20, wherein the partial trimerization is carried out at a temperature of 20 to 180° C.

28. The process as claimed in claim 20, wherein the isophorone diisocyanate is prepared by a phosgene process or a phosgene-free process.

29. The process as claimed in claim 20, wherein the monomer-containing polyisocyanurate mixture comprise one or more free —NCO groups.

30. The process as claimed in claim 20, wherein the monomer-containing polyisocyanurate mixture has a free —NCO content of 25 to 34% by weight with respect to the total weight of said mixture.

31. The process as claimed in claim 20, wherein the partial trimerization is carried out continuously.

32. The process as claimed in claim 20, wherein the partial trimerization is carried out batchwise.

33. The process as claimed in claim 20, wherein the partial trimerization is carried out in a solvent selected from the group consisting of water, methanol, acetic acid, hexanoic acid, and a mixture thereof.

34. The process as claimed in claim 20, which is carried out in the absence of a catalyst deactivating agent.

35. The process as claimed in claim 20, further comprising reacting the monomer-containing polyisocyanurate mixture with a blocking agent selected from the group consisting of lactams, oximes, triazoles, enolizable compounds, malonic acid derivatives, and mixtures thereof.

36. The process as claimed in claim 20, further comprising reacting the monomer-containing polyisocyanurate mixture with a blocking agent selected from the group consisting of 6-caprolactam, oxime, methyl ethyl ketoxime, butanone oxime, 1H-1,2,4-triazole, ethyl acetoacetate or acetylacetone, diester of malonic acid, and mixtures thereof.

37. The process as claimed in claim 20, wherein said process is carried out in a solvent, further comprising separating said solvent from said mixture.

38. A monomer-containing polyisocyanurate mixture, prepared by a process comprising:
partially trimerizing isophorone diisocyanate in the presence of a catalyst having the formula:

wherein R is a benzyl group, Y⁻ is a carboxylate anion having from 4 to 8 carbon atoms and each X is an alkylene group having from 2 to 3 carbon atoms, wherein the three alkylene groups share a common carbon atom and, together with the N atom in the formula, form a bridged tricyclic structure, and wherein at least one alkyene group has at least one OH group in an α or β or γ position relative to the N atom.

* * * * *